(12) United States Patent
Inami et al.

(10) Patent No.: US 12,286,019 B2
(45) Date of Patent: Apr. 29, 2025

(54) VEHICLE-BODY STRUCTURE WITH A BATTERY COVER FOR IMPROVED AERODYNAMIC PERFORMANCE

(71) Applicant: Mazda Motor Corporation, Hiroshima (JP)

(72) Inventors: Takuma Inami, Hiroshima (JP); Nobuyuki Nakayama, Hiroshima (JP); Hiroyuki Baba, Hiroshima (JP); Hiroshi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 491 days.

(21) Appl. No.: 17/938,956

(22) Filed: Sep. 7, 2022

(65) Prior Publication Data

US 2023/0101665 A1    Mar. 30, 2023

(30) Foreign Application Priority Data

Sep. 30, 2021  (JP) ................................. 2021-161834
Nov. 10, 2021  (JP) ................................. 2021-183335

(51) Int. Cl.
*B60L 50/60*     (2019.01)
*B60K 1/04*      (2019.01)
*B62D 25/20*     (2006.01)
*B62D 35/02*     (2006.01)

(52) U.S. Cl.
CPC ............... *B60L 50/66* (2019.02); *B60K 1/04* (2013.01); *B62D 25/20* (2013.01); *B62D 35/02* (2013.01); *B60K 2001/0438* (2013.01)

(58) Field of Classification Search
CPC ... B60L 50/66; B60K 1/04; B60K 2001/0438; B62D 25/20; B62D 35/02
See application file for complete search history.

(56) References Cited

U.S. PATENT DOCUMENTS

| | | | |
|---|---|---|---|
| 8,939,246 B2* | 1/2015 | Yamaguchi | B60L 50/66 180/311 |
| 9,809,101 B2* | 11/2017 | Ikeda | B62D 29/001 |
| 10,800,459 B2* | 10/2020 | Ayukawa | B60L 50/66 |
| 10,967,912 B2* | 4/2021 | Toyota | B62D 21/157 |

(Continued)

FOREIGN PATENT DOCUMENTS

| | | |
|---|---|---|
| JP | 2005-41395 A | 2/2005 |
| JP | 2009-101815 A | 5/2009 |

(Continued)

*Primary Examiner* — Jacob B Meyer
(74) *Attorney, Agent, or Firm* — XSENSUS LLP

(57) ABSTRACT

A vehicle-body structure both protects a battery and provides a routing member below a floor panel that improves underfloor aerodynamic performance. Embodiments of a vehicle-body structure may include: a routing member that extends in a vehicle front-rear direction on a vehicle-width-direction outer side of a battery frame below a floor panel; a cover member that extends from a lower side of a battery to a lower side of the routing member; battery-frame fixation portions that fix the battery frame to side sills; and cover-member fixation portions that fix a vehicle-width-direction end portion of the cover member to the side sills. The routing member and the battery-frame fixation portions may be positioned on a vehicle-width-direction inner side of the cover-member fixation portions.

7 Claims, 6 Drawing Sheets

(56) References Cited

U.S. PATENT DOCUMENTS

| | | | |
|---|---|---|---|
| 11,801,742 B2* | 10/2023 | Yaita | B60L 3/0046 |
| 12,134,312 B2* | 11/2024 | Kamei | B60K 1/04 |
| 2022/0227215 A1* | 7/2022 | Ishizaki | B62D 21/157 |
| 2022/0379962 A1* | 12/2022 | Kamei | B62D 21/15 |
| 2023/0101665 A1* | 3/2023 | Inami | B60H 1/00557 |
| | | | 180/68.5 |
| 2023/0264561 A1* | 8/2023 | Kamemoto | B62D 25/08 |
| | | | 180/312 |
| 2024/0109594 A1* | 4/2024 | Iemura | B62D 21/157 |

FOREIGN PATENT DOCUMENTS

| | | | | |
|---|---|---|---|---|
| JP | 2017226353 A | * | 12/2017 | |
| JP | 2018-158688 A | | 10/2018 | |
| JP | 2019-123461 A | | 7/2019 | |
| JP | 2019-177831 A | | 10/2019 | |
| JP | 2021-35789 A | | 3/2021 | |
| KR | 100299618 B1 | * | 10/2001 | |
| WO | WO-2021070288 A1 | * | 4/2021 | B60K 1/04 |
| WO | WO-2021166337 A1 | * | 8/2021 | B60K 1/04 |
| WO | WO-2024084590 A1 | * | 4/2024 | |

* cited by examiner

VEHICLE-BODY STRUCTURE WITH A BATTERY COVER FOR IMPROVED AERODYNAMIC PERFORMANCE

CROSS-REFERENCES TO RELATED APPLICATIONS

The present application claims priority to Japanese Patent Application 2021-161834, filed Sep. 30, 2021, and Japanese Patent Application 2021-183335, filed Nov. 10, 2021, the entire contents of each of which are incorporated herein by reference.

TECHNICAL FIELD

The present disclosure relates to a vehicle-body structure provided in an electric automobile that protects the battery and improves aerodynamic performance.

BACKGROUND

In an electric vehicle including a traveling motor, mounting a large-capacity battery provides for a longer cruising range. For example, Patent Laid-open No. 2018-158688 ("Patent Literature 1") discloses a structure in which a large-sized battery is mounted below a floor panel disposed between a pair of right and left side sills. The battery of Patent Literature 1 is configured to be housed in a case body portion of a rectangular box shape, and an attachment portion provided to the case body portion is fixed to a floor-underneath reinforcement.

Various routing members such as pipes and harnesses extending in the vehicle front-rear direction are provided below a floor panel in some cases. In such a case, a cover is needed to protect the routing members.

Handling of underfloor turbulence and the like during traveling is important for improving aerodynamic performance of an automobile in some cases, and when a battery is mounted below the floor panel, a battery cover is additionally needed to protect the battery, and thus, underfloor aerodynamic performance potentially degrades when the above-described cover of the routing members is provided below the floor panel in addition to the battery cover.

The present disclosure has been made in view of the above-described problem and has an objective to achieve both protection of a battery and a routing member provided below a floor panel and improvement of underfloor aerodynamic performance.

SUMMARY

To achieve the above-described objective, a vehicle-body structure provided in an electric vehicle including a traveling motor may be premised in a first aspect of the present disclosure. The vehicle-body structure according to the first aspect of the present disclosure includes: a floor panel constituting a floor of an occupant space including a seat on which a passenger sits; a pair of right and left side sills extending in a vehicle front-rear direction at respective ones of both vehicle-width-direction end portions of the floor panel; a battery unit that includes a battery frame and supplies electric power to the traveling motor, the battery frame being arranged between the pair of right and left side sills and extending in the vehicle front-rear direction; a routing member that extends in the vehicle front-rear direction on a vehicle-width-direction outer side of the battery frame below the floor panel; a cover member that extends from a lower side of the battery unit to a lower side of the routing member; battery-frame fixation portions that fix the battery frame to the side sills; and cover-member fixation portions that fix vehicle-width-direction end portions of the cover member to the side sills. The routing member and the battery-frame fixation portions are positioned on a vehicle-width-direction inner side of the cover-member fixation portions.

With this first configuration, since the cover member extends from the lower side of the battery unit to the lower side of the routing member and the routing member and the battery-frame fixation portions are positioned on the vehicle-width-direction inner side of the cover-member fixation portions, the battery unit and the routing member are covered and protected by the same cover member, which improves underfloor aerodynamic performance.

A vehicle-body structure according to a second aspect of the present disclosure includes: a floor panel; a pair of right and left side sills; a battery housing space that is provided between the pair of right and left side sills below the floor panel and in which the battery unit is housed; a routing-member housing space that is provided between a vehicle-width-direction outer side of the battery frame and each of the side sills below the floor panel and in which a routing member extending in the vehicle front-rear direction is housed; a cover member that covers the battery housing space and the routing-member housing space from below; and cover-member fixation portions that fix the cover member to the side sills.

With this second configuration, the battery housing space and the routing-member housing space are both covered and protected by the same cover member, which improves underfloor aerodynamic performance.

The battery unit according to a third aspect of the present disclosure includes a battery arranged on a vehicle-width-direction inner side of the battery frame. A sealing member is provided between a lower surface of the battery frame and an upper surface of the cover member.

With this third configuration, entrance of water and dust through a gap between the battery frame and the cover member is suppressed, which improves battery protection performance.

In a fourth aspect of the present disclosure, a protrusion portion that protrudes downward and extends in the vehicle front-rear direction is provided at a part separated outward from a vehicle-width-direction inner end portion on a lower side of each of the side sills. The routing member is provided on a vehicle-width-direction inner side of the protrusion portion.

With this fourth configuration, the routing member can be provided along the protrusion portion provided at each of the side sills.

In a fifth aspect of the present disclosure, each of the battery-frame fixation portions may be provided on the vehicle-width-direction inner side of the protrusion portion on the lower side of the corresponding side sill.

In a sixth aspect of the present disclosure, the cover-member fixation portions may be provided at the protrusion portions.

As described above in reference to various aspects of the present disclosure, a battery unit and a routing member can be covered and protected by the same cover member, and underfloor aerodynamic performance can be improved.

DETAILED DESCRIPTION

An embodiment of the present disclosure will be described below in detail with reference to the accompanying drawings. The following description of the preferable embodiment is merely exemplary in essence and not intended to limit the present disclosure, its application, nor its usage.

Figure 1:
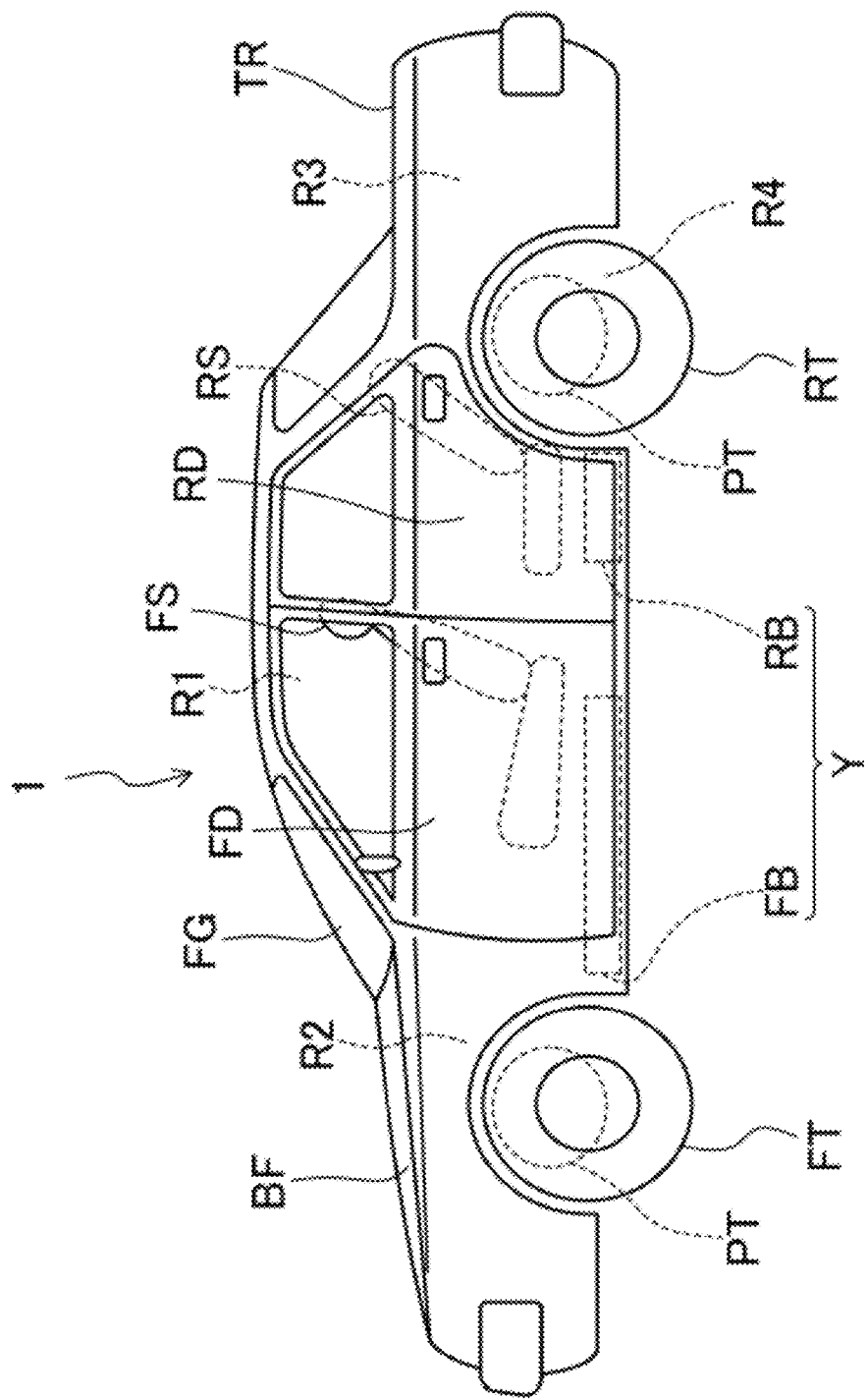
FIG. 1 is a side view of an automobile having a vehicle-body structure according to an embodiment of the present disclosure.

FIG. 1 is a side view of an automobile 1 including a vehicle-body structure A (illustrated in FIG. 2) according to the embodiment of the present disclosure when viewed from left. In describing the embodiment, a vehicle front-rear direction is simply referred to as a "front-rear direction", a vehicle front side is simply referred to as a "front side", and a vehicle rear side is simply referred to as a "rear side". In addition, a vehicle width direction is the right-left direction of the vehicle, a vehicle left side is simply referred to as a "left side", and a vehicle right side is simply referred to as a "right side".

Entire Structure of Automobile

In some embodiments, the automobile 1 of FIG. 1 is a passenger automobile, and an occupant space R1 in which a passenger boards is provided at a front-rear direction intermediate portion of the automobile 1. The occupant space R1 includes front seats (front-row seats) FS included in a front row, and rear seats (rear-row seats) RS included in a rear row. The front seats FS include a driver seat arranged on the right side (or the left side) in the occupant space R1, and a front passenger seat arranged on the left side (or the right side) in the occupant space R1. The rear seats RS are arranged on the right and left sides, respectively, in the occupant space R1. Although not illustrated, third-row seats may be arranged on the rear side of the rear seats RS. Alternatively, the rear seats RS may be omitted.

A front door FD and a rear door RD are disposed on each of the left and right sides of the occupant space R1. The rear door RD may be omitted in a case of the automobile 1 including no rear seats RS.

As illustrated in the embodiment of FIG. 1, a front-side space R2 is provided on the front side of the occupant space R1 in the automobile 1. A powertrain PT can be mounted in the front-side space R2 as necessary. When the powertrain PT is mounted in the front-side space R2, the front-side space R2 may be called, for example, a powertrain storage room, a motor room, or an engine room. A bonnet hood BF is provided at an upper portion of the front-side space R2.

As illustrated in the embodiment of FIG. 1, a trunk space R3 in which a package or the like can be housed may be provided on the rear side of the occupant space R1 of the automobile 1. The trunk space R3 can be opened and closed by a trunk lid TR. A rear-side space R4 may be provided on the rear side of the occupant space R1 and at a position lower than the trunk space R3 in the automobile 1. The powertrain PT that generates power for the automobile 1 can be mounted in the rear-side space R4 as necessary. When the powertrain PT is mounted in the rear-side space R4, the rear-side space R4 may be called, for example, a powertrain storage room, a motor room, or an engine room.

The powertrain PT may be mounted in each of the front-side space R2 and the rear-side space R4 or the powertrain PT may be mounted in one of them. A front-wheel-drive vehicle in which only front wheels FT are driven by the powertrain PT is achieved when the powertrain PT is mounted only in the front-side space R2, or a rear-wheel-drive vehicle in which only rear wheels RT are driven by the powertrain PT is achieved when the powertrain PT is mounted only in the rear-side space R4. Alternatively, a four-wheel-drive vehicle is achieved when the front wheels FT and the rear wheels RT are driven by the powertrains PT mounted in both the front-side space R2 and the rear-side space R4.

Each powertrain PT includes at least a traveling motor M (illustrated in FIG. 2) for driving a drive wheel and also includes a speed reducer, a transmission, or the like as necessary. Thus, the automobile 1 is an electric vehicle. The traveling motor M is disposed such that the rotation center thereof extends in the right-left direction. The powertrain PT may include, for example, a controller in addition to the traveling motor M. The powertrain PT may include an internal combustion engine. A battery unit Y (also illustrated in FIG. 1) for supplying electric power to the traveling motor M is mounted at a lower portion of the automobile 1. For example, the battery unit Y may be charged by using power generated by the internal combustion engine, and either the front wheels FT or the rear wheels RT or both may be driven by power generated by the internal combustion engine.

The type of the automobile 1 does not necessarily need to be a four-door vehicle as exemplarily illustrated in FIG. 1 and may be, for example, an automobile including no rear doors RD. The present disclosure is also applicable to an automobile, such as a hatchback vehicle, in which the rear-side space R4 can be opened and closed by a tail gate.

Figure 2:
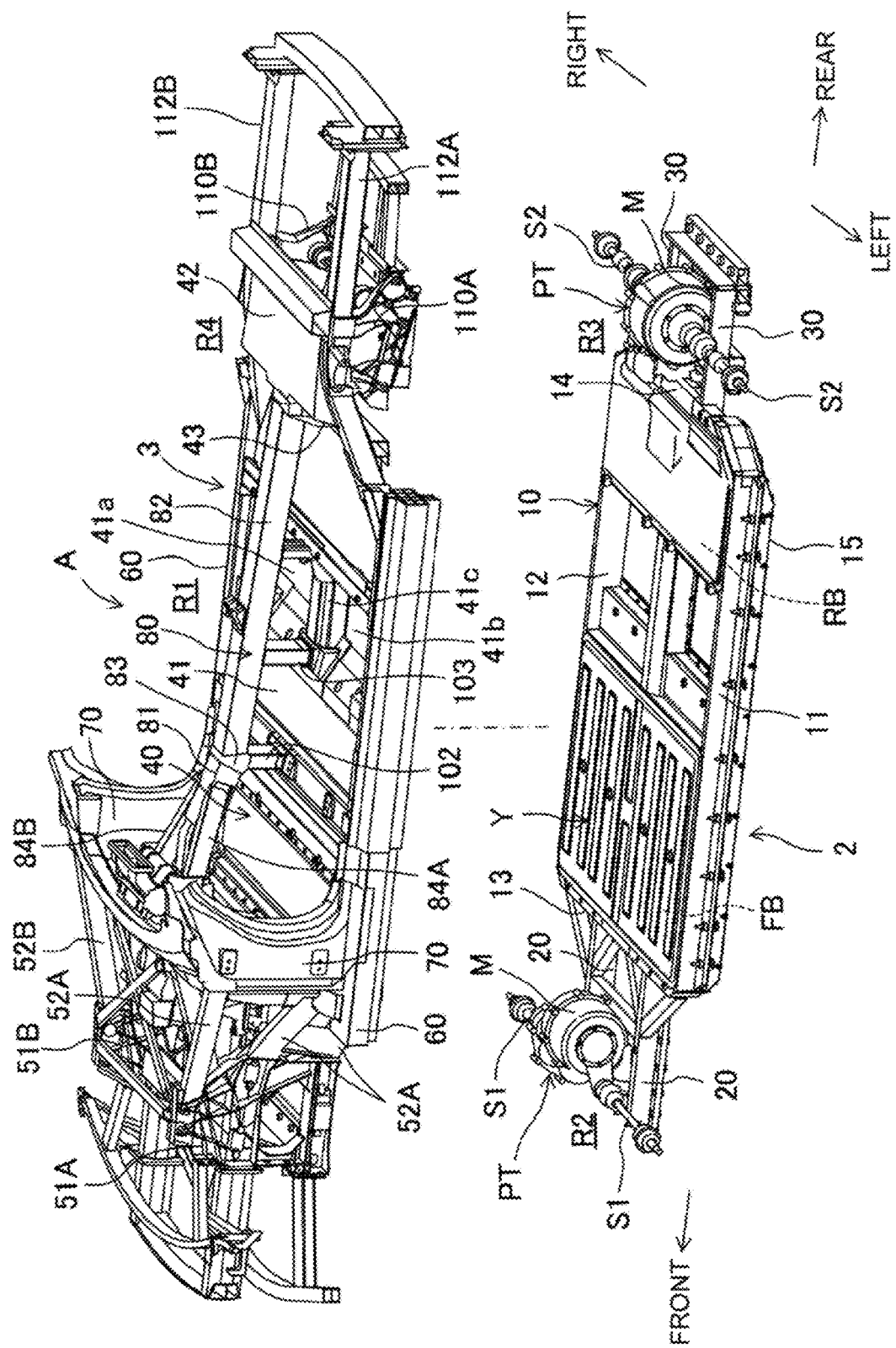
FIG. 2 is a perspective view illustrating a state in which the automobile is divided into an upper-portion structural body and a lower-portion structural body.

As illustrated in FIG. 2, the automobile 1 includes a lower-portion structural body 2 and an upper-portion structural body 3, and the vehicle-body structure A is constituted by a front portion of the lower-portion structural body 2 and a front portion of the upper-portion structural body 3. FIG. 2 illustrates a state in which the doors FD and RD, the bonnet hood BF, a fender, window glasses, a roof, a center pillar, a rear pillar, the front bumper, a rear bumper, front and rear lighting devices including headlights, an instrument panel, the front and rear seats, and the like, which are included in the upper-portion structural body 3 when the automobile is assembled, are removed. FIG. 2 also illustrates a state in which the front wheels FT, the rear wheels RT, a suspension device, and the like, which are included in the lower-portion structural body 2 when the automobile is assembled, are removed.

The lower-portion structural body 2 includes the battery unit Y. The battery unit Y includes a front-side battery FB, a rear-side battery RB, and a rack frame (battery frame) 10 surrounding the front-side battery FB and the rear-side battery RB. The lower-portion structural body 2 also includes a front support frame 20 extending from a front portion of the rack frame 10 toward the front side, and a rear support frame 30 extending from a rear portion of the rack frame 10 toward the rear side.

In a typical electric automobile, a battery unit is often detachably attached as a separated body from a vehicle body under a floor; but, in the embodiment of FIG. 2, not only the batteries FB and RB but also the front support frame 20 and the rear support frame 30 are integrated with the rack frame 10 surrounding the batteries FB and RB, and the front support frame 20 and the rear support frame 30 are detachably attached to the upper-portion structural body 3 together with the batteries FB and RB.

Specifically, as illustrated in FIG. 2, in some embodiments the automobile 1 may be configured to be dividable in the up-down direction into the lower-portion structural body 2 including the batteries FB and RB, and the upper-portion structural body 3 in which the occupant space R1 and the trunk space R3 are formed. When the structure is divided in the up-down direction, integration of the lower-portion structural body 2 with the upper-portion structural body 3 may be achieved by using fastening members such as bolts and nuts, screws, and the like without using welding, bonding, and the like. Accordingly, the lower-portion structural body 2 can be separated from the upper-portion structural body 3 as necessary when maintenance and repair are performed after the automobile 1 is handed over to a user, thereby making it easier to maintain the vehicle than in conventional electric automobiles.

It is known to use a vehicle-body structure of a ladder-frame type for an automobile. In a case of the vehicle-body structure of the ladder-frame type, division into a ladder-frame and a cabin in the up-down direction is possible, but the ladder-frame continuously extends in the front-rear direction and thus mainly receives a collision load during a front-end collision or a rear-end collision. In the event of a side collision, the ladder frame only supplementarily receives a collision load, and the collision load is mainly received by the cabin. In this manner, in the vehicle-body structure of the ladder-frame type, it is normal that a member that receives a collision load during a front or a rear collision is different than during a side collision.

However, in a case of the automobile 1 of the embodiment illustrated in FIG. 2, the lower-portion structural body 2, which includes the front support frame 20 and the rear support frame 30, and the upper-portion structural body 3 can be divided from each other. The technical idea of this divided structure is largely different from that of the conventional vehicle-body structure of the ladder-frame type, because a collision load is received by the lower-portion structural body 2 and the upper-portion structural body 3 in both cases of front or rear collision and side collision and thus the collision load can be dispersed to and absorbed by the structural bodies 2 and 3, which improves vehicle safety during collisions when compared to conventional ladder-frame type vehicles.

Hereinafter, the structures of the lower-portion structural body 2 and the upper-portion structural body 3 will be sequentially described. Note that an example in which division into the lower-portion structural body 2 and the upper-portion structural body 3 is possible will be described below with respect to the Figures, but the improvements described in the present disclosure are not limited to a vehicle-body structure in which such division is possible; the present disclosure is also applicable to a vehicle-body structure that cannot be divided into the lower-portion structural body 2 and the upper-portion structural body 3, including conventional ladder-frame vehicle types.

Lower-Portion Structural Body

First, the lower-portion structural body 2 will be described below. The lower-portion structural body 2 includes the powertrain PT, the front wheels FT, the rear wheels RT, and front-side suspension devices SP1 and SP2 and rear-side suspension devices SP3 and SP4, which are illustrated with virtual lines in FIG. 4, in addition to the batteries FB and RB, the rack frame 10, the front support frame 20, and the rear support frame 30. The formats of the front-side suspension devices SP1 and SP2 and the rear-side suspension devices SP3 and SP4 are not particularly limited, and the vehicle-body structure may be changed in accordance with the formats of the front-side suspension devices SP1 and SP2 and the rear-side suspension devices SP3 and SP4.

Figure 5:
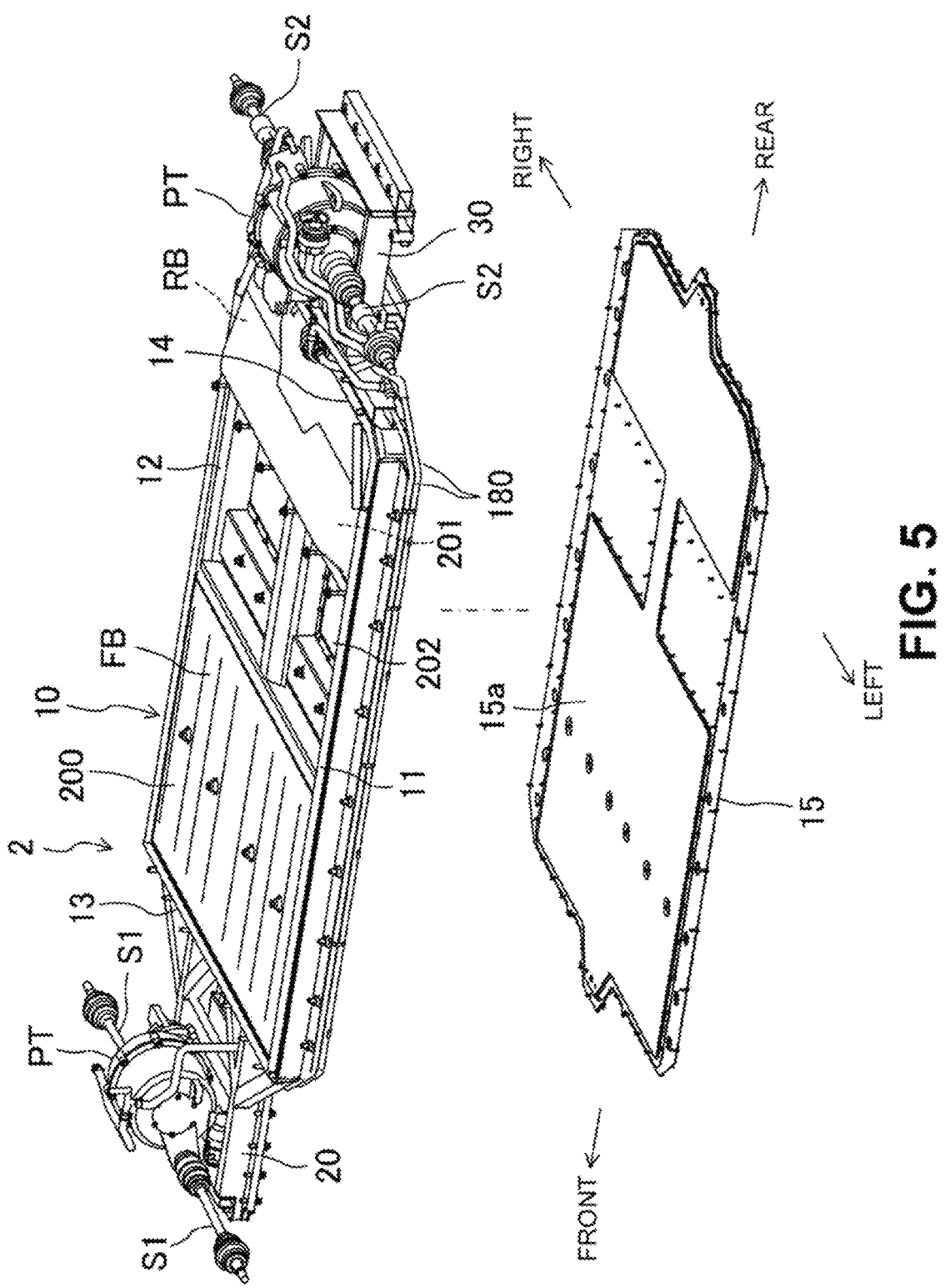
FIG. 5 is a perspective view illustrating part of the lower-portion structural body in a state in which a cover member is removed.

As illustrated in FIG. 2, the rack frame 10 as a framework of the battery unit Y is a member for surrounding and protecting the front-side battery FB, the rear-side battery RB, harnesses, and the like, and the front-side battery FB and the rear-side battery RB are arranged on a vehicle-width-direction inner side of the rack frame 10. As illustrated in FIG. 5 as well, the rack frame 10 is formed in such a large size that, on the lower side of an occupant-space-side floor panel 41 to be described later, the rack frame 10 extends from the vicinity of a left end portion of the occupant-space-side floor panel 41 to the vicinity of a right end portion thereof and extends from the vicinity of a front end portion of the occupant-space-side floor panel 41 to the vicinity of a rear end portion thereof. In this manner, since the rack frame 10 is provided in a large part of a region on the lower side of the occupant-space-side floor panel 41, the batteries FB and RB having large capacities can be mounted on the automobile 1. The batteries FB and RB may be, for example, lithium-ion batteries or all-solid-state batteries or may be any other secondary batteries. Alternatively, the batteries FB and RB may be what is called battery cells or may be battery packs in which a plurality of battery cells are housed.

The rack frame 10 includes a left-side member 11, a right-side member 12, a front-side member 13, and a rear-side member 14, is arranged between a pair of right and left side sills 60, and extends in the front-rear direction as a whole. The left-side member 11, the right-side member 12, the front-side member 13, and the rear-side member 14 are formed of, for example, an extruded material made of an aluminum alloy, but may be formed of a press-formed material such as an aluminum alloy plate material or a steel plate. In description below, an "extruded material" is an extruded material made of an aluminum alloy, and a "press-formed material" is a press-formed material such as an aluminum alloy plate material or a steel plate. Alternatively, each member may be formed of, for example, cast metal or die cast, among other materials.

A cross-sectional shape of each of the left-side member 11, the right-side member 12, the front-side member 13, and the rear-side member 14 in a direction orthogonal to its longitudinal direction is a rectangular shape. The left-side member 11, the right-side member 12, the front-side member 13, and the rear-side member 14 are all arranged at the same height and substantially horizontally extend. The front-side member 13 extends in the vehicle width direction at a front portion of the battery unit Y.

When the lower-portion structural body 2 is to be connected to the upper-portion structural body 3, the front-side member 13 is fastened and fixed to a lower portion of a dash panel 50 by a fastening member, and the left-side member 11 and the right-side member 12 are fastened and fixed to right and left-side sills 60, respectively, by fastening members. The rear-side member 14 is fastened and fixed to a connection panel 43, which will be described later, by a fastening member.

The left-side member 11 is provided at a left end portion of the lower-portion structural body 2 and extends in the front-rear direction. The right-side member 12 is provided at a right end portion of the lower-portion structural body 2 and extends in the front-rear direction. The left-side member 11 and the right-side member 12 are arranged on a vehicle-width-direction inner side of the right and left-side sills 60, respectively, to be described later. The front-side member 13 extends from a front end portion of the left-side member 11 to a front end portion of the right-side member 12. A left end portion of the front-side member 13 and the front end portion of the left-side member 11 are connected to each other, and a right end portion of the front-side member 13 and the front end portion of the right-side member 12 are connected to each other. The rear-side member 14 is provided at a rear portion of the battery unit Y and extends in the right-left direction from a rear end portion of the left-side member 11 to a rear end portion of the right-side member 12. A left end portion of the rear-side member 14 and the rear end portion of the left-side member 11 are connected to each other, and a right end portion of the rear-side member 14 and the rear end portion of the right-side member 12 are connected to each other.

A cover member 15 (illustrated in FIG. 5) as a bottom plate is attached to a lower portion of the rack frame 10. The rack frame 10 is blocked from the lower side by the cover member 15. The cover member 15 substantially horizontally extends and is fixed to lower surfaces of the left-side member 11, the right-side member 12, the front-side member 13, and the rear-side member 14 and also fixed to the side sills 60 as described later. Note that an upper portion of the rack frame 10 may be blocked by a non-illustrated lid or may be blocked by the occupant-space-side floor panel 41 to be described later. Note that electric power of the batteries FB and RB housed in the rack frame 10 is supplied to the traveling motor M through a non-illustrated traveling control circuit. The batteries FB and RB can be charged through a charging socket (not shown).

As illustrated in FIG. 2, a pair of right and left front support frames 20 are provided and substantially horizontally extend in straight lines on the lower side of the upper-portion structural body 3. The left-side front support frame 20 is connected to a site on the left side of a right-left direction center of the front-side member 13 constituting the front portion of the rack frame 10. The right-side front support frame 20 is connected to a site on the right side of the right-left direction center of the front-side member 13. The front-side powertrain PT is attached to each front support frame 20 through a mounting member (not shown). In the lower-portion structural body 2, drive shafts S1 through which output from the powertrain PT (rotational force of the traveling motor M) is transferred to the right and left front wheels FT, respectively, are provided on the right and left sides.

Similarly to the front support frames 20, a pair of right and left rear support frames 30 are provided and substantially horizontally extend in straight lines toward the rear side. The rear-side powertrain PT is attached to each rear support frame 30 through a mounting member (not shown). In the lower-portion structural body 2, drive shafts S2 through which output from the powertrain PT (rotational force of the traveling motor M) is transferred to the right and left rear wheels, respectively, are provided on the right and left sides.

Upper-Portion Structural Body

Subsequently, the upper-portion structural body 3 will be described below. The upper-portion structural body 3 includes a floor member 40, the dash panel 50, and the pair of right and left-side sills 60. The floor member 40 is a member arranged at a higher position than the rack frame 10 and the rear support frames 30 of the lower-portion structural body 2. The floor member 40 includes the occupant-space-side floor panel 41 constituting a floor of the occupant space R1 including the front seats FS and the rear seats RS (illustrated in FIG. 1) on which passengers sits, a trunk-space-side floor panel 42 constituting a floor of the trunk space R3, and the connection panel 43 connecting a rear portion of the occupant-space-side floor panel 41 and a front portion of the trunk-space-side floor panel 42. A kick-up portion is constituted by the connection panel 43.

The floor member 40 may be formed of, for example, a member shaped by pressing a steel plate or the like. The occupant-space-side floor panel 41, the trunk-space-side floor panel 42, and the connection panel 43 may be integrally formed or may be formed by separately forming components and then connecting them. In the present embodiment, description is made with the three divided portions of the occupant-space-side floor panel 41, the trunk-space-side floor panel 42, and the connection panel 43, but the floor member 40 including the panels 41 to 43 may be referred to as a floor panel. Alternatively, only the occupant-space-side floor panel 41 may be referred to as a floor panel.

The occupant-space-side floor panel 41 extends from a front portion of the occupant space R1 to a rear portion thereof and from a left-side portion of the occupant space R1 to a right-side portion thereof. The occupant-space-side floor panel 41 according to the embodiment of FIG. 2 has a floor tunnel-less structure including no tunnel portion but may include a tunnel portion.

A recessed portion 41a formed bulging downward is formed at a front-rear direction intermediate portion of the occupant-space-side floor panel 41. The recessed portion 41a has a bottom surface 41b on which the feet of a rear-seat passenger sitting on a rear seat RS can be placed. The bottom surface 41b is substantially horizontally formed. The recessed portion 41a may be continuously formed from a left side portion of the occupant-space-side floor panel 41 to a right side portion thereof.

The trunk-space-side floor panel 42 is positioned higher than the occupant-space-side floor panel 41. The rear-side space R4 is positioned lower than the trunk-space-side floor panel 42. Since the trunk-space-side floor panel 42 is arranged at a higher position than the occupant-space-side floor panel 41, the connection panel 43 extends in the up-down direction.

Figure 3:
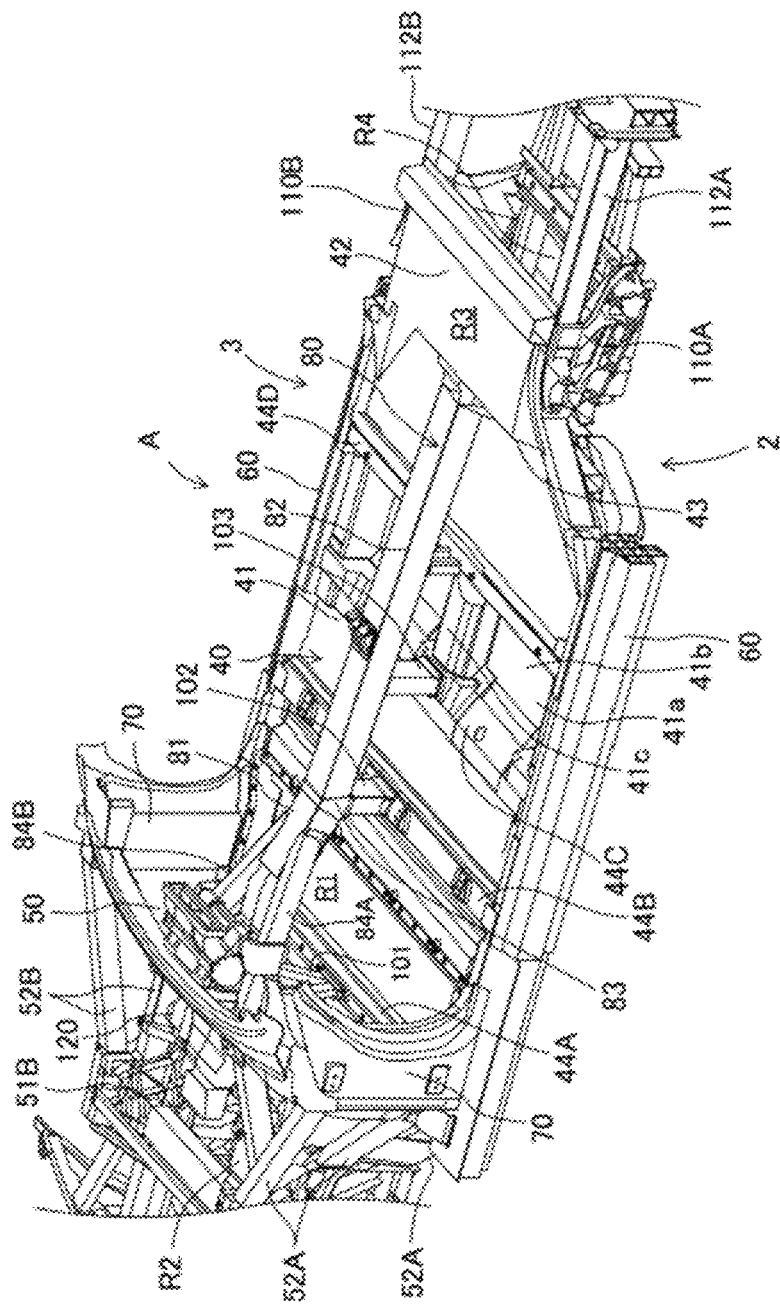
FIG. 3 is a perspective view of part of the vehicle-body structure.

As illustrated in FIG. 3 as well, the dash panel 50 is a member as a partition wall between the front-side space R2 and the occupant space R1 and extends upward from a front portion of the occupant-space-side floor panel 41 and in the right-left direction as well, thereby partitioning the front portion of the occupant space R1.

Figure 6:
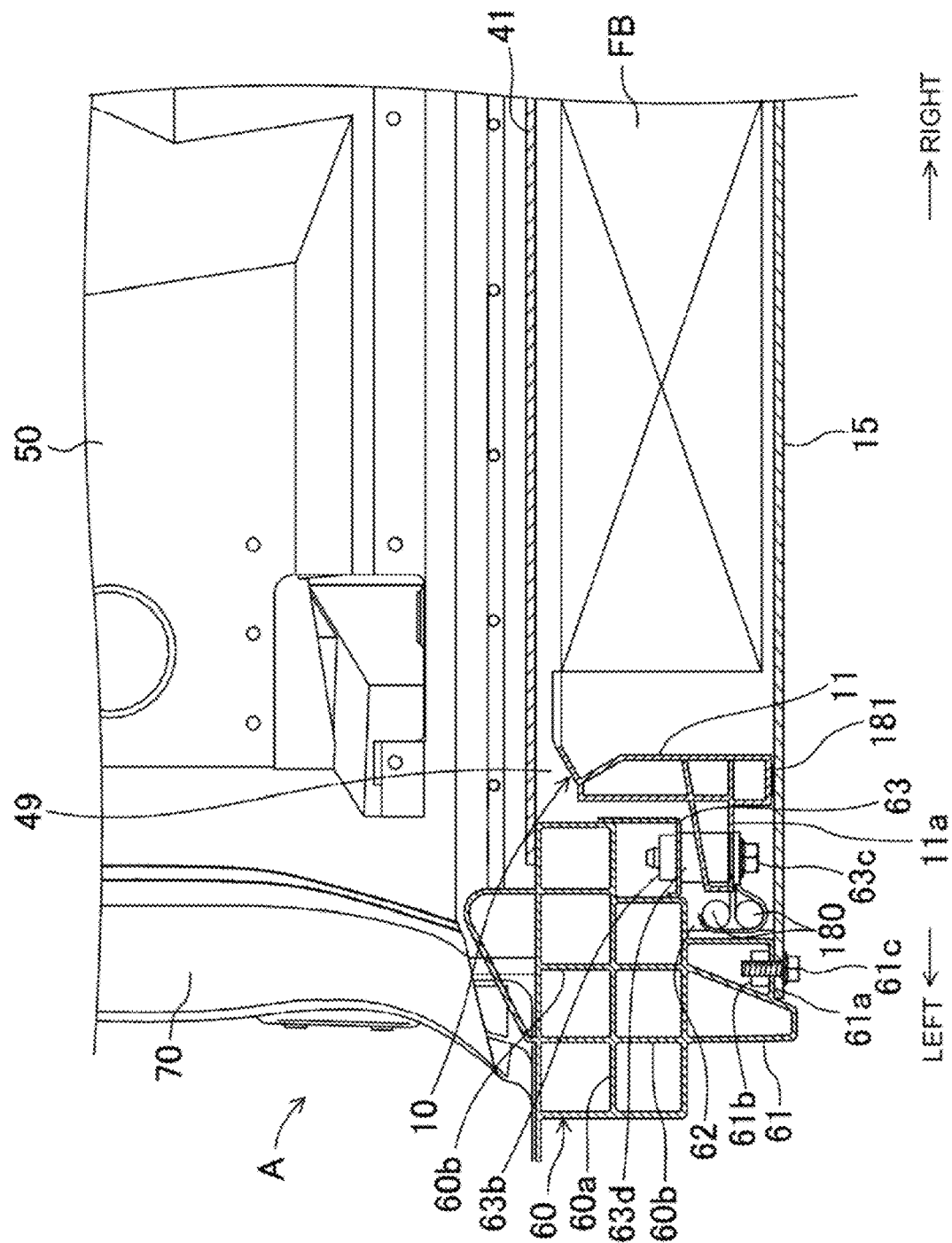
FIG. 6 is a cross-sectional diagram along line VI-VI in FIG. 4.

As illustrated in FIG. 2, the right and left side sills 60 are disposed extending in the front-rear direction at right and left end portions, respectively, of the occupant-space-side floor panel 41. The left end portion of the occupant-space-side floor panel 41 is connected to an up-down direction intermediate portion of the left side sill 60, an upper part of the side sill 60 protrudes upward from a connection site of the occupant-space-side floor panel 41, and a lower part of the side sill 60 protrudes downward from the connection site of the occupant-space-side floor panel 41. Since the battery unit Y including the batteries FB and RB is disposed at a lower position than the occupant-space-side floor panel 41, such arrangement is made that the lower part of the side sill 60 overlaps with the batteries FB and RB in a vehicle side view. Similarly, the right side sill 60 is connected to the right end portion of the occupant-space-side floor panel 41. As illustrated in FIG. 6, a battery housing space 49 in which the battery unit Y is housed is provided between the pair of right and left side sills 60 below the occupant-space-side floor panel 41.

The upper-portion structural body 3 includes a pair of right and left hinge pillars 70. The right hinge pillar 70 extends upward from a front end portion of the right side sill 60. The left hinge pillar 70 extends upward from a front end portion of the left side sill 60. The right and left front doors FD (illustrated in FIG. 1) are rotatably attached to the right and left hinge pillars 70, respectively. A left edge portion of the dash panel 50 is connected to a right-side surface of the left hinge pillar 70. A right edge portion of the dash panel 50 is connected to a left-side surface of the right hinge pillar 70. Note that, although not illustrated, the upper-portion structural body 3 is also provided with a center pillar, a rear pillar, and the like.

A left-side front-wheel suspension support member 51A that supports the suspension device (front suspension device) SP1 (illustrated with virtual lines in FIG. 4) for the left front wheel FT is provided on the left side on the front side of the dash panel 50 in the upper-portion structural body 3. A right-side front-wheel suspension support member 51B that supports the suspension device (front suspension device) SP2 (illustrated with virtual lines in FIG. 4) for the right front wheel FT is provided on the right side on the front side of the dash panel 50 in the upper-portion structural body 3.

Figure 4:
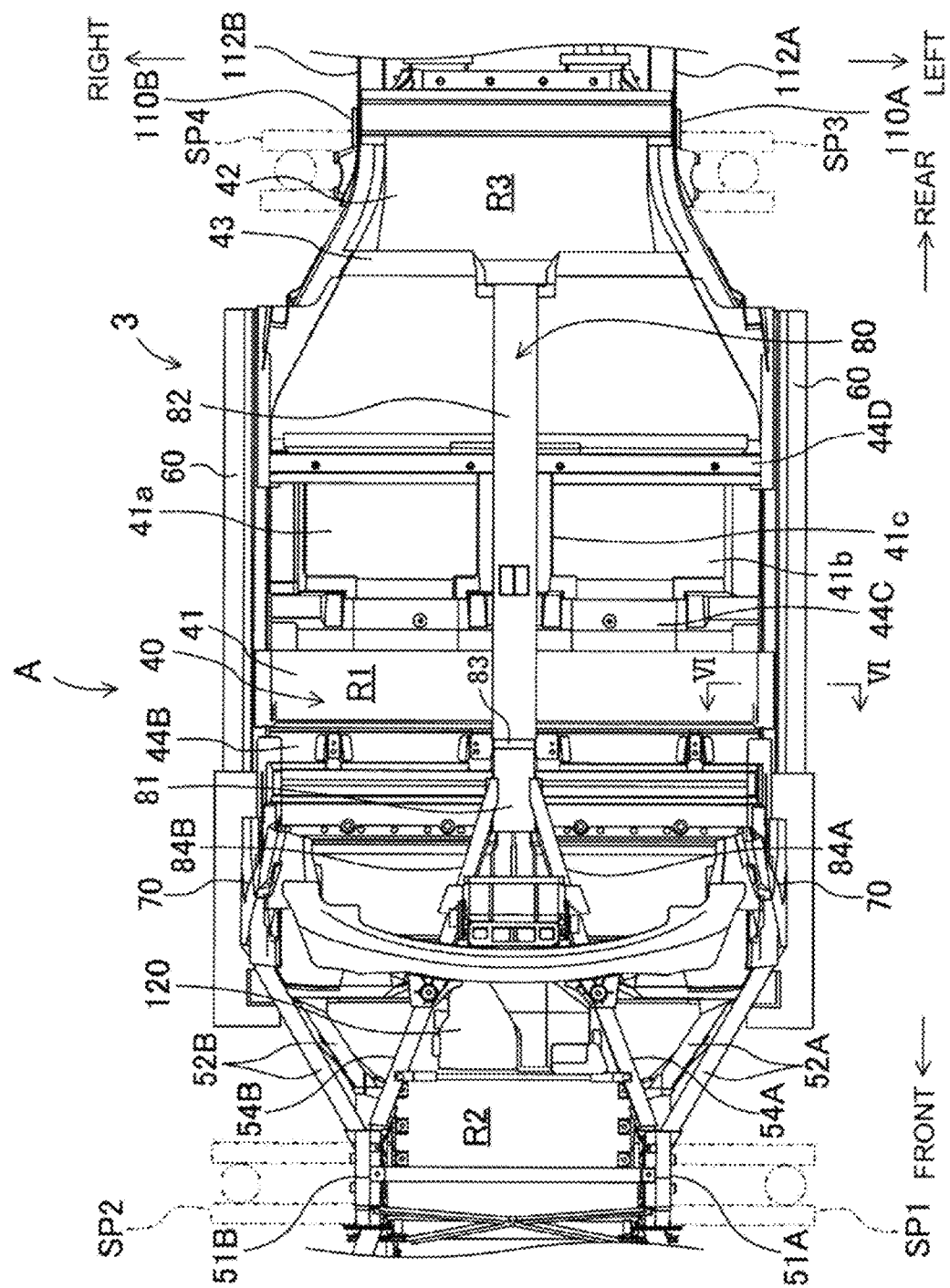
FIG. 4 is a plan view of part of the vehicle-body structure.

As illustrated in, for example, FIG. 4, a left-side fixation frame 52A for fixing the left-side front-wheel suspension support member 51A, and a right-side fixation frame 52B for fixing the right-side front-wheel suspension support member 51B are provided at a vehicle-body front portion. The upper-portion structural body 3 includes a left-side front frame 54A and a right-side front frame 54B.

The upper-portion structural body 3 includes a left-side rear-side frame 112A extending in the front-rear direction on the left side on the rear side of the rear portion of the occupant-space-side floor panel 41, and a right-side rear-side frame 112B extending in the front-rear direction on the right side on the rear side of the rear portion of the occupant-space-side floor panel 41.

A left-side rear-wheel suspension support member 110A that supports the suspension device (rear suspension device) SP3 (illustrated with virtual lines in FIG. 4) for the left rear wheel RT is provided on the left side on the rear side of the connection panel 43 in the upper-portion structural body 3. A right-side rear-wheel suspension support member 110B that supports the suspension device (rear suspension device) SP4 (illustrated with virtual lines in FIG. 4) for the right rear wheel RT is provided on the right side on the rear side of the connection panel 43 in the upper-portion structural body 3.

Examples of the format of the suspension devices SP1, SP2, SP3, and SP4 include an air suspension device including an air spring constituted by an air chamber. The air suspension device may include an air pump, air pipes through which air pressurized and transferred from the air pump is transferred to front and rear air chambers, and valves for adjusting the amount of air transferred to the air chambers and the amount of air discharged from the air chambers.

As illustrated in the embodiment of FIG. 3, the occupant-space-side floor panel 41 includes a front-portion cross member 44A, an intermediate cross member 44B, a recessed-portion front-side cross member 44C, and a recessed-portion rear-side cross member 44D. The front-portion cross member 44A, the intermediate cross member 44B, the recessed-portion front-side cross member 44C, and the recessed-portion rear-side cross member 44D extend in the right-left direction and are fixed to the upper surface of the occupant-space-side floor panel 41.

The front-portion cross member 44A is disposed at the front portion of the occupant-space-side floor panel 41. A front portion of the front-portion cross member 44A is also joined to the lower portion of the dash panel 50. The intermediate cross member 44B is disposed on the rear side of the front-portion cross member 44A and on the front side of the recessed portion 41a.

The recessed-portion front-side cross member 44C is disposed extending in the right-left direction along the front portion of the recessed portion 41a on the rear side of the intermediate cross member 44B. The recessed-portion rear-side cross member 44D is disposed extending in the right-left direction along a rear portion of the recessed portion 41a on the rear side of the recessed-portion front-side cross member 44C. A closed cross-section is constituted by the recessed-portion front-side cross member 44C and the occupant-space-side floor panel 41, and a closed cross-section is constituted by the recessed-portion rear-side cross member 44D and the occupant-space-side floor panel 41. Since the recessed-portion front-side cross member 44C and the recessed-portion rear-side cross member 44D are provided, the part at which the recessed portion 41a is formed is reinforced. A front portion of the floor frame 41c provided inside the recessed portion 41a is connected to a right-left direction central portion of the recessed-portion front-side cross member 44C, and a rear portion of the floor frame 41c is connected to a right-left direction central portion of the recessed-portion rear-side cross member 44D.

As illustrated in, for example, FIG. 2, the upper-portion structural body 3 includes the center frame 80 continuously extending in the front-rear direction from the dash panel 50 to the connection panel 43. The center frame 80 is positioned at a right-left direction central portion, and a rear portion of the center frame 80 is connected to the connection panel 43. The left-side front seat FS and a rear seat RS are disposed on the left side of the center frame 80, and the right-side front seat FS and a rear seat RS are disposed on the right side of the center frame 80.

The center frame 80 includes a front-side frame member 81 extending in the front-rear direction, a rear-side frame member 82 disposed on the vehicle rear side of the front-side frame member 81 and extending toward the rear side, and a connection member 83 connecting a rear portion of the front-side frame member 81 and a front portion of the rear-side frame member 82. The front-side frame member 81 and the rear-side frame member 82 have hollow shapes, in other words, tubular shapes extending in the front-rear direction and may be formed of, for example, an extruded material. Note that the center frame 80 is not limited to the two-division structure of the front-side frame member 81 and the rear-side frame member 82 but may be formed as one member or may have a three-division structure. When the center frame 80 is formed as one member, the connection member 83 may be omitted.

As illustrated in FIG. 3, the center frame 80 also includes a left-side frame member 84A and a right-side frame member 84B constituting the front portion of the center frame 80. A rear portion of the left-side frame member 84A is fixed to a left-side surface of a front-rear direction intermediate portion of the front-side frame member 81. A rear portion of the right-side frame member 84B is fixed to a right-side surface of the front-rear direction intermediate portion of the front-side frame member 81.

The upper-portion structural body 3 includes a first fixation member 101, a second fixation member 102, and a third fixation member 103 that fix the center frame 80 to the occupant-space-side floor panel 41. A lower portion of the third fixation member 103 is connected to the right-left-direction central portion of the recessed-portion front-side cross member 44C.

FIG. 5 is a perspective view illustrating part of the lower-portion structural body 2 in a state in which the cover member 15 is removed. A path component 15a constituting a cooling water path through which the cooling water can circulate is provided on the upper surface of the cover member 15. The path component 15a is positioned directly below the front-side battery FB and the rear-side battery RB, and cooling of the front-side battery FB and the rear-side battery RB is efficiently performed by the cooling water circulating inside the path component 15a.

As illustrated in FIG. 6, a routing member 180 extending in the front-rear direction below the occupant-space-side floor panel 41 is provided on the left side of the left-side member 11 of the rack frame 10 (vehicle-width-direction outer side of the rack frame 10). Specifically, a routing-member housing space 62 in which the routing member 180 is housed is continuously formed in the front-rear direction between the vehicle-width-direction outer side of the left-side member 11 and the left-side side sill 60 below the occupant-space-side floor panel 41. The routing member 180 is, for example, a harness, a cooling water pipe, a coolant pipe, a hydraulic pressure pipe, or an air pipe, and only one of them may be provided or optional two or more of them may be provided. The air pipe is a pipe or the like connected to, for example, front and rear air suspension devices or air pumps. Although not illustrated, another routing-member housing space may be provided on the right side. Alternatively, the routing-member housing space may be provided on only one of the left side and the right side.

The cover member 15 is provided from the lower side of the left-side member 11 of the rack frame 10 to the lower side of the right-side member 12 and is also provided from the lower side of the front-side member 13 to the lower side of the rear-side member 14. Specifically, the cover member 15 extends from the lower side of the battery unit Y to the lower side of the routing member 180, and accordingly, is a large member covering the battery housing space 49 and the routing-member housing space 62 from below. When the cover member 15 of such a size is provided, a large part of a lower portion of the vehicle body is covered by the cover member 15, and thus the cover member 15 functions as a bottom cover, which suppresses underfloor air turbulence generation at traveling.

In the example illustrated in FIG. 5, since the cover member 15 is formed as one member, the number of components at assembly can be reduced, which is advantageous. Note that the cover member 15 also may be formed by combining a plurality of members. For example, a plurality of plate materials extending in the vehicle width direction may be arranged in the front-rear direction and joined to constitute one cover member 15, or a plurality of plate materials extending in the front-rear direction may be arranged in the vehicle width direction and joined to constitute one cover member 15. The structure of the cover member 15 may be a structure in which the plurality of plate materials are each fixed to the vehicle body.

As illustrated in FIG. 6, a sealing material 181 made of an elastic material such as rubber is disposed between the upper surface of the cover member 15 and the lower surface of the rack frame 10. The sealing material 181 extends in an annular shape along the lower surface of the rack frame 10. In a state in which the cover member 15 is attached to the side sills 60, the sealing material 181 is compressed by the upper surface of the cover member 15 and the lower surface of the rack frame 10 and elastically deformed. Accordingly, the sealing material 181 closely contacts the upper surface of the cover member 15 and the lower surface of the rack frame 10, and suppresses entrance of water, dust, and the like through a gap between the cover member 15 and the rack frame 10.

A protrusion portion 61 that protrudes downward and extends in the front-rear direction is provided at a part separated outward from a vehicle-width-direction inner end portion on the lower side of each side sill 60. The routing member 180 is provided on the vehicle-width-direction inner side of the protrusion portion 61. In the present embodiment, the protrusion portion 61 is provided at a vehicle-width-direction intermediate portion on the lower side of the side sill 60, but the protrusion portion 61 may have a shape that reaches a vehicle-width-direction outer end portion on the lower side of the side sill 60. In addition, a horizontal rib 60a extending in the vehicle width direction and a vertical rib 60b extending in the up-down direction are provided inside the side sill 60. The horizontal rib 60a and the vertical rib 60b are integrally shaped.

A lower wall portion 61a of the protrusion portion 61 horizontally extends in the right-left direction and the front-rear direction. The cover member 15 is fixed to the lower wall portion 61a of the protrusion portion 61. Specifically, a nut 61b is fixed to an upper surface of the lower wall portion 61a of the protrusion portion 61. A left-side portion of the cover member 15 is placed over a lower surface of the lower wall portion 61a of the protrusion portion 61. The cover member 15 is detachably fixed to the side sill 60 when a bolt 61c is screwed to the nut 61b through the left-side portion of the cover member 15 from the lower side and through the lower wall portion 61a of the protrusion portion 61 from the lower side. The nut 61b and the bolt 61c are each a cover-member fixation portion that fixes a vehicle-width-direction end portion of the cover member 15 to the side sill 60, and a plurality of nuts 61b and a plurality of bolts 61c are provided at intervals in the front-rear direction.

A fixation plate portion 63 horizontally extending in the right-left direction and the front-rear direction is provided on the vehicle-width-direction inner side of the housing space 62 of the side sill 60. The left-side member 11 of the rack frame 10 is provided with a fastening target portion 11a protruding leftward, and the fastening target portion 11a is fixed to the fixation plate portion 63. Specifically, a nut 63b is fixed to an upper surface of the fixation plate portion 63. The fastening target portion 11a is placed over a lower surface of the fixation plate portion 63. The left-side member 11 of the rack frame 10 is detachably fixed to the side sill 60 when a bolt 63c is screwed to the nut 63b through the fastening target portion 11a from the lower side and through the fixation plate portion 63 from the lower side. Reference sign 63d denotes a tubular collar that is a member for setting the height of the rack frame 10 after fixation to the side sill 60 to a predetermined height. A plurality of nuts 63b and a plurality of bolts 63c are provided at intervals in the front-rear direction. The same configuration as that on the left side is provided on the right side. The nuts 63b and the bolts 63c are each a battery-frame fixation portion that fixes the rack frame 10 to the side sill 60.

In the embodiment, the routing member 180 and the nuts 63b and the bolts 63c for fixing the rack frame 10 to the side sill 60 are positioned on the vehicle-width-direction inner side of the nuts 61b and the bolts 61c for fixing the vehicle-width-direction end portion of the cover member 15 to the side sill 60. The routing member 180 is positioned between the set of the nuts 63b and the bolts 63c and the set of the nuts 61b and the bolts 61c. The nuts 63b are positioned higher than the nuts 61b.

As described above, according to embodiments of the disclosure, since the battery housing space 49 and the routing-member housing space 62 provided below the occupant-space-side floor panel 41 can be covered by the same cover member 15, underfloor aerodynamic performance can be improved as compared to a case in which the battery housing space 49 and the routing-member housing space 62 are covered by separate members.

Moreover, since the battery unit Y in the battery housing space 49 and the routing member 180 housed in the routing-member housing space 62 can be protected by the same cover member 15, the number of components can be reduced, which simplifies manufacturing and assembly.

In addition, since the sealing material 181 is provided between the upper surface of the cover member 15 and the lower surface of the rack frame 10, entrance of water and dust through the gap between the cover member 15 and the rack frame 10 is suppressed, which further improves protection performance for the front-side battery FB and the rear-side battery RB.

As described above, the present disclosure is applicable as, for example, a vehicle-body structure of an electric vehicle.

REFERENCE NUMBERS LIST 1 automobile
10 rack frame (battery frame)
15 cover member
41 occupant-space-side floor panel
49 battery housing space
60 side sill
61 protrusion portion
61b, 61c nut, bolt (cover-member fixation portion)
62 routing-member housing space
63b, 63c nut, bolt (battery-frame fixation portion)
180 routing member
181 sealing material
M traveling motor
Y battery unit The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

What is claimed is:

1. A vehicle-body structure provided in an electric vehicle comprising a traveling motor, the vehicle-body structure comprising:
    a floor panel constituting a floor of an occupant space comprising a seat on which a passenger sits;
    a pair of right and left side sills extending in a vehicle front-rear direction at respective ones of both vehicle-width-direction end portions of the floor panel;
    a battery that comprises a battery frame and supplies electric power to the traveling motor, the battery frame being arranged between the pair of right and left side sills and extending in the vehicle front-rear direction;
    a routing member that extends in the vehicle front-rear direction on a vehicle-width-direction outer side of the battery frame below the floor panel;
    a cover that extends from a lower side of the battery unit to a lower side of the routing member;
    battery-frame fixation portions that fix the battery frame to the side sills; and
    cover fixation portions that fix vehicle-width-direction end portions of the cover to the side sills,
    wherein the routing member and the battery-frame fixation portions are positioned on a vehicle-width-direction inner side of the cover fixation portions.

2. The vehicle-body structure according to claim 1, wherein
    a protrusion portion that protrudes downward and extends in the vehicle front-rear direction is provided at a part separated outward from a vehicle-width-direction inner end portion on a lower side of each of the side sills, and
    the routing member is provided on a vehicle-width-direction inner side of the protrusion portion.

3. The vehicle-body structure according to claim 2, wherein
    each of the battery-frame fixation portions is provided on the vehicle-width-direction inner side of the protrusion portion on the lower side of the corresponding side sill.

4. The vehicle-body structure according to claim 3, wherein
    the cover fixation portions are provided at the protrusion portions.

5. The vehicle-body structure according to claim 1, further comprising:
    a sealing member provided between a lower surface of the battery frame and an upper surface of the cover,
    wherein the battery unit comprises a battery arranged on a vehicle-width-direction inner side of the battery frame.

6. A vehicle-body structure provided in an electric vehicle comprising a traveling motor and a battery unit that comprises a battery frame and supplies electric power to the traveling motor, the battery frame extending in a vehicle front-rear direction, the vehicle-body structure comprising:
- a floor panel constituting a floor of an occupant space comprising a seat on which a passenger sits;
- a pair of right and left side sills extending in a vehicle front-rear direction at respective ones of both vehicle-width-direction end portions of the floor panel;
- a battery housing space that is provided between the pair of right and left side sills below the floor panel and in which the battery unit is housed;
- a routing-member housing space that is provided between a vehicle-width-direction outer side of the battery frame and each of the side sills below the floor panel and in which a routing member extending in the vehicle front-rear direction is housed;
- a cover that covers the battery housing space and the routing-member housing space from below; and
- cover fixation portions that fix the cover to the side sills.

7. The vehicle-body structure according to claim 6, further comprising:
- a sealing member provided between a lower surface of the battery frame and an upper surface of the cover,
- wherein the battery unit comprises a battery arranged on a vehicle-width-direction inner side of the battery frame.

* * * * *